United States Patent [19]

Rosenberg

[11] 4,059,230

[45] Nov. 22, 1977

[54] FLUID FLOW CONTROL DEVICE AND FLUID DISTRIBUTION SYSTEM INCLUDING A PLURALITY OF SUCH DEVICES

[76] Inventor: Peretz Rosenberg, Moshav Beit Shearim, Israel

[21] Appl. No.: 766,409

[22] Filed: Feb. 7, 1977

Related U.S. Application Data

[63] Continuation of Ser. No. 654,910, Feb. 3, 1976, abandoned.

[30] Foreign Application Priority Data

Feb. 7, 1975   Israel ........................................ 46586

[51] Int. Cl.² ............................................. B05B 15/00
[52] U.S. Cl. .................................................... 239/542
[58] Field of Search ................. 239/76, 267, 269, 542; 138/40, 46

[56] References Cited

U.S. PATENT DOCUMENTS

| 1,390,047 | 9/1921 | Lange ............................. 239/267 X |
| 2,021,305 | 11/1935 | Harr ........................................ 138/40 |
| 2,393,854 | 1/1946 | Carpenter ........................... 138/40 X |
| 3,912,165 | 10/1975 | Pira ..................................... 239/76 X |
| 3,917,174 | 11/1975 | Hildebrandt ....................... 239/76 X |

FOREIGN PATENT DOCUMENTS 1,389,971   4/1975   United Kingdom ................. 239/542

Primary Examiner—John J. Love
Attorney, Agent, or Firm—Benjamin J. Barish

[57] ABSTRACT

A fluid-flow control device comprises a fluid coupling having an inlet connectable to a supply line, an outlet connectable to an outlet device, a flow-deviating member having two taps connected by a quickly attachable and detachable tube disposed externally of the control device through which the fluid is constrained to flow from the coupling inlet to the coupling outlet, the external tube, the flexible tube having a predetermined length, substantially greater than the distance between the taps, to thereby cause a predetermined pressure drop in the fluid flowing therethrough from the coupling inlet to its outlet.

Also described is a fluid distribution system including a plurality of the above fluid-flow control devices connected to a fluid supply line, the tubes connected between the two taps in the fluid couplings being of differing predetermined lengths to provide a substantially uniform outlet pressure of flow rate to the outlet devices along the line from the upstream end to the downstream end of the line.

9 Claims, 2 Drawing Figures

FLUID FLOW CONTROL DEVICE AND FLUID DISTRIBUTION SYSTEM INCLUDING A PLURALITY OF SUCH DEVICES

This is a continuation of application Ser. No. 654,910, filed Feb. 3, 1976 and now abandoned.

BACKGROUND OF THE INVENTION

The present invention relates to fluid-flow control devices, and to fluid distribution systems including a plurality of such devices. The invention is particularly useful with respect to water irrigation systems, and is therefore described below with respect to that application.

In water irrigation systems supplying water to a plurality of sprinklers, there is a continuous drop in the water pressure from the upstream end of the supply line to the downstream end, so that, unless this is corrected, the downstream sprinklers will distribute less water than the upstream sprinklers. This variation in the water pressure along the line may also be caused by the sprinklers being at different elevations. For these reasons, pressure regulators are commonly included within the branch lines, or within the sprinklers themselves, to maintain a substantially constant outlet pressure. Pressure-regulators, however, are expensive to produce to install, and to maintain. Moreover, where the sprinklers include small-orifice nozzles, for example in under-tree sprinkling at a rate of about 100 liters per hour, the pressure regulators commonly include small passageways which are easily cloggable and which therefore require frequent cleaning.

SUMMARY OF THE INVENTION

An object of the present invention is to provide a fluid-flow control device, and also a fluid distribution system, having advantages in the above respects.

According to one aspect of the present invention, there is provided a fluid-flow control device comprising: a fitting including an inlet connectable to a supply line, an outlet connectable to an outlet device, and a flow-deviating member having a first tap establishing communication between the inlet and a first fixed external point on the fitting, a second tap establishing communication between the outlet and a second fixed external point on the fitting, a tube disposed externally of the fitting and connected between the two mentioned external points thereof, and means constraining the fluid to flow from the inlet to the outlet through said external tube. The external tube has a predetermined length, substantially greater than the distance between said taps, to thereby cause a predetermined pressure drop in the fluid flowing therethrough from the coupling inlet to its outlet.

Preferably, the tube is flexible and has quickly-attachable and detachable connectors at both ends to facilitate changing the pressure drop by attaching tubes of different predetermined lengths to the taps.

Further, the coupling device preferably includes an inlet chamber at the inlet side of the barrier and an outlet chamber at the outlet side of the barrier, the tube having an inner diameter substantially less than the cross-sectional dimensions of said chambers. Two specific structures of such a coupling device are described below for purposes of example.

According to another aspect of the invention, there is provided a fluid distribution system including a fluid supply line, a plurality of coupling devices connected thereto, each of the coupling devices including a pair of taps in the path of fluid flow, and a plurality of tubes of differing predetermined lengths connected between the taps to provide a substantially uniform outlet pressure or flow rate along the line from the upstream end to the downstream end thereof.

It will thus be seen that the fluid-flow coupling devices of the present invention can be used to equalize the pressure as flow-rate of the fluid supplied to the outlet devices, such as water sprinklers, notwithstanding variations in the pressure drop along the line or differences in elevation of the outlet devices, by merely selecting the appropriate connecting tubes. Thus, a simple, inexpensive and easily maintainable arrangement is provided for correcting for pressure or flow-rate differences along the line.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
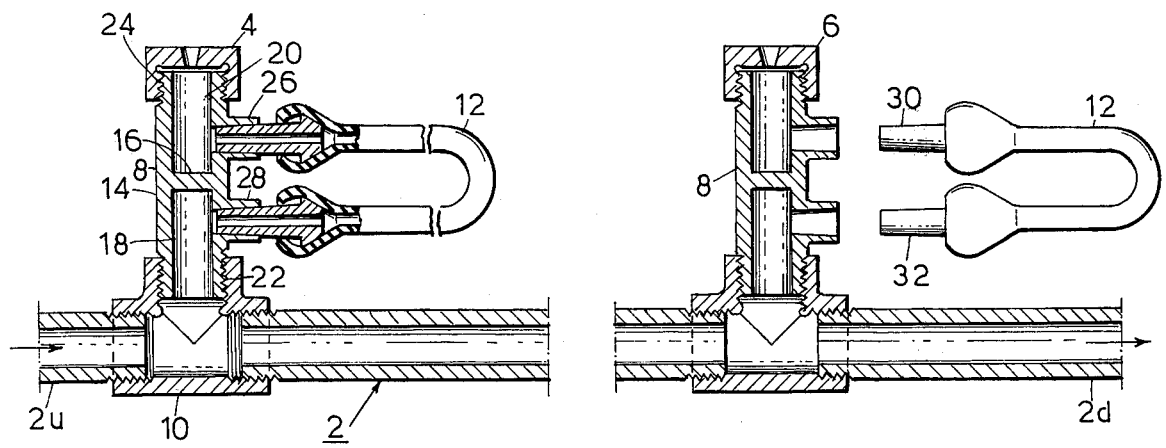
FIG. 1 is a sectional view illustrating a water distribution system constructed in accordance with the invention, for supplying water to a plurality of sprinklers connected to a main water supply line.

With reference to FIG. 1, there is shown a water supply line, generally designated 2, supplying water to a plurality of sprinklers 4, 6. Sprinkler 4 is illustrated as being at the upstream end 2u of the supply line, and sprinkler 6 is illustrated as being towards the downstream end 2d. Each sprinkler is supplied with water via a fitting or coupling device 8 coupled at one end to the water supply line by means of a T-fitting 10, and carrying the water sprinkler 4 or 6 at its opposite end. The coupling devices 8 are the same for all the sprinklers, except for a flexible tube 12 attached externally to each coupling device, as will be described more particularly below.

Each coupling device 8 includes a flow-deviating member in the form of a generally cylindrical housing 14 formed with a barrier or partition 16 dividing the housing into an inlet chamber 18 on one side of the barrier, and an outlet chamber 20 at the opposite side of the barrier. The inlet end of the coupling housing 8 is attached to the T-fitting 10 by means of threads 22, and the sprinkler 4 is attached to the outlet end of the coupling housing by means of threads 24.

Each coupling device is further formed with a pair of taps connected together by the flexible tube 12. One tap 26 is formed through the wall of the coupling device on the outlet side of barrier 16 and established communication between the outlet chamber 20 and a fixed point externally of housing 14; and the other tap 28 is formed on the inlet side of the barrier and establishes communication between the inlet chamber 18 and another fixed point externally of housing 14.

Each flexible tube 12 includes a coupling member 30, 32 at its opposite ends which members are quickly-attachable to and detachable from the external ends of taps 26, 28 formed in the coupling device 8. For example, the structure of the coupling members 30, 32, may be as described in my prior U.S. Pat. No. 3,751,075. Its structure is more particularly shown in the embodiment of FIG. 2, wherein it will be seen that it is generally tubular in shape and includes an annular shoulder 34 dividing the member into a short part 36 and a longer part 38, the external diameter of the short part 36 increasing gradually towards shoulder 34, and the external diameter of the longer part 38 increasing more gradually than the short part towards the shoulder. Shoulder 34 has a sharp peripheral edge, the wall joining same to the long part 38 being substantially at right angles to the longitudinal axis of the member.

Figure 2:
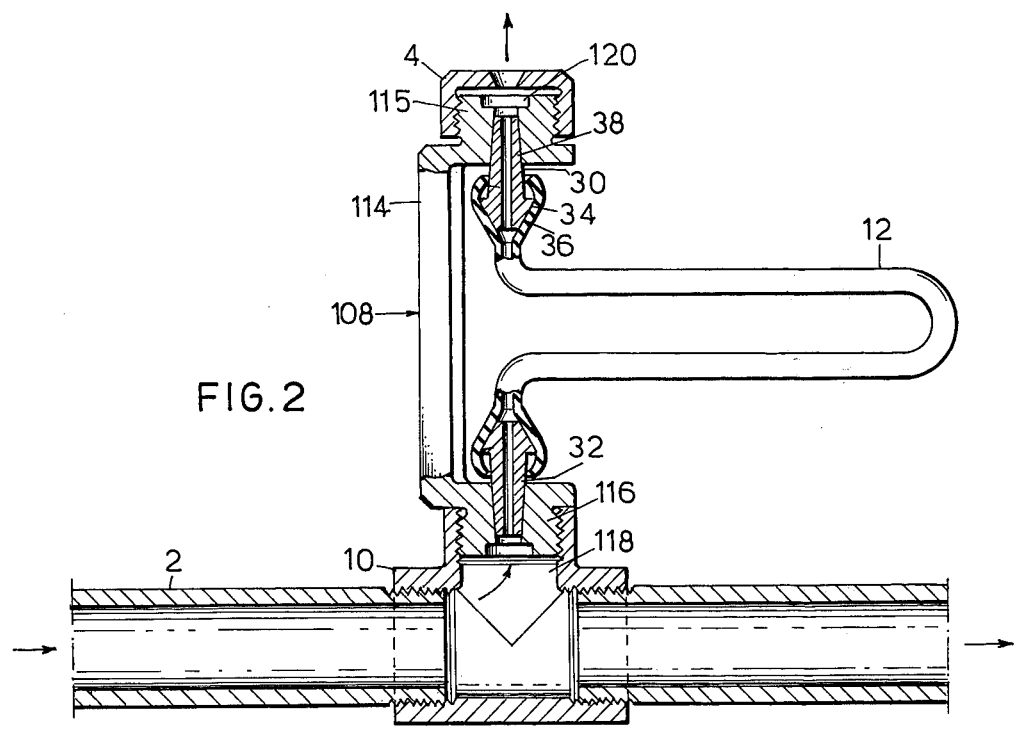
FIG. 2 illustrates another form of fluid-flow control device that may be used in the water distribution system of FIG. 1.

The two coupling members 30, 32, are applied to the ends of the external flexible tube 12, such that the end of the flexible tube tightly encloses both the short part 36 and the annular shoulder 34, and the long part 38 projects externally of the flexible tube for quick attachment to and detachment from the respective tap 26, 28 of the coupling device 8. The latter tap may have tapered openings, as shown in FIG. 2, to receive and frictionally hold the long part 38 of the respective coupling member attached to the flexible tube 12.

It will thus be seen that the water supplied to coupling devices 8 along the water supply line 2 first enters the inlet chamber 18 of the device and then, by virtue of barrier 16, is deviated, and constrained to pass through the external flexible tube 12 connected between the taps 26, 28 before entering the outlet chamber 20 to the outlet sprinkler, e.g. 4. Each flexible tube 12 would be of a predetermined length substantially greater than the distance between the two taps 26, 28, and would have an inner diameter considerably less than the cross-sectional dimensions of the two chambers 18, 20. Thus, a pressure drop will be produced in the water flowing through tube 12 connecting the two chambers 18, 20 of the coupling device, and this pressure drop will be dependent upon the length of the tube used for connecting the two taps. This is shown in FIG. 1, wherein the tube 12 used with respect to the upstream sprinkler 4 is longer than tube 12 used with respect to the downstream sprinkler 6. In actual practice, the tubes will usually be of substantially greater length than illustrated in FIG. 1.

Thus, by providing a number of flexible tubes 12 of different lengths, each quickly attachable to and detachable from the taps 26, 28 of the various coupling devices 8 along the water supply line, a predetermined pressure drop can be introduced into each respective branch to fix the outlet pressure or the outlet flow-rate as desired, thereby enabling the correction of pressure or flow differences because of pressure drop along the watery supply line, or because of different elevations at which the sprinklers are disposed.

For example, it is not unusual for the pressure in a water supply line, supplying about 10 nozzles of the small orifice type outputting about 100 liters per hour each, to vary from about 3 atmospheres at the upstream end to about 2 atmospheres at the downstream end. This can be easily corrected by using flexible tubes 12 having an inner diameter of 4 mm, and different predetermined lengths of from 0.5 to 3 meters, to produce a substantially constant output pressure of about 1.8 atmospheres.

FIG. 2 illustrates a variation, wherein the fluid-flow control device, generally designated 108, includes a flow-deviating member in the form of a bracket 114 formed at opposite ends with a pair of centrally apertured and externally threaded embossments, 115, 116 receiving an external tube 12. Embossment 116 is threaded into the T-fitting 10, and forms with it an inlet chamber 118. Embossment 115 threadedly receives the sprinkler 4, and forms with it an outlet chamber 120. The flexible tube 12, including the coupling members 30, 32 at its opposite ends, is externally of the coupling connected between the apertures or openings formed within the embossments 115, 116, by frictionally inserting the long part 38 of the coupling member into the opening in the respective embossment. The latter openings in the two embossments are preferably tapered as described above.

It will be seen that the FIG. 2 embodiment operates basically in the same manner as that of FIG. 1. Thus, the bracket 114 and its external tube 12 constitute a flow-deviating member constraining the flow of the water from the inlet chamber 118 to the outlet chamber 120 through the flexible tube 12 connected to the openings formed in the two embossments 115, 116, the latter openings constituting taps formed on the bracket and establishing communication between the coupling inlet and outlet chambers via external tube 12. Accordingly, by attaching a flexible tube of appropriate predetermined length, a predetermined pressure drop may be produced between the inlet and outlet chambers 118, 120 in the same manner as described above with respect to FIG. 1, to fix the pressure or flow-rate of the water outputted from the respective sprinkler 4.

While tubes 12 are preferably flexible, to enable different predetermined lengths to be applied between the taps, it will be appreciated that they could be rigid, with the tubes in coiled form and having different numbers of coils to provide different lengths.

Many other variations, modifications and applications of the illustrated embodiments will be apparent.

What is claimed is:

1. A fluid-flow control device, comprising: a fitting including an inlet connectable to a supply line; an outlet connectable to an outlet device; and a flow-deviating member having a first tap establishing communication between said inlet and a first fixed external point on said fitting, a second tap establishing communication between said outlet and a second fixed external point on said fitting, a tube disposed externally of said fitting and connected between said two external points thereof, and means constraining the fluid to flow through said tube from said inlet to said outlet; said tube having a predetermined length, substantially greater than the distance between said fixed external points on said fitting, to thereby produce a predetermined pressure drop in the fluid flowing therethrough from said inlet to said outlet.

2. A device according to claim 1, wherein the flow-deviating member includes an inlet chamber at the inlet side thereof, an outlet chamber at the outlet side, and a partition separating said chambers and constituting said constraining means, said tube having an inner diameter substantially less than the cross-sectional dimensions of said chambers.

3. A device according to claim 1, wherein said tube includes quickly attachable and detachable connectors at both ends to facilitate changing said pressure drop by attaching tubes of different predetermined lengths to the taps.

4. A device according to claim 1, wherein said tube of predetermined length is a flexible tube.

5. A device according to claim 1, wherein the flow-deviating member includes a cylindrical housing having a partition dividing the interior to form inlet and outlet chambers, the inlet chamber end of the cylindrical housing being threadedly attachable to the fluid supply line, and the outlet chamber end of the cylindrical housing threadedly receiving the outlet device.

6. A device according to claim 1, wherein the flow-deviating member includes a bracket formed with a pair of opposed apertured embossments, one of said embossments being threadedly attachable to the supply line and the other of said embossments threadedly receiving the outlet device, the apertures in said embossments constituting the taps receiving said tube of predetermined length.

7. A fluid distribution system including a plurality of fluid-flow control devices according to claim 1, connected to a fluid supply line, the tubes connected between the two taps in the flow-deviating members being of differing predetermined lengths to provide a substantially uniform outlet pressure or flow rate to the outlet devices along the line from the upstream end to the downstream end thereof.

8. A fluid distribution system according to claim 7, wherein said tubes of differing predetermined lengths are flexible tubes.

9. A fluid distribution system according to claim 8, wherein each device includes an inlet chamber at the inlet side of the fitting and an outlet chamber at the outlet side of the fitting, each of said flexible tubes having an inner diameter substantially less than the cross-sectional dimensions of said chambers.

* * * * *